Figures 1, 2:
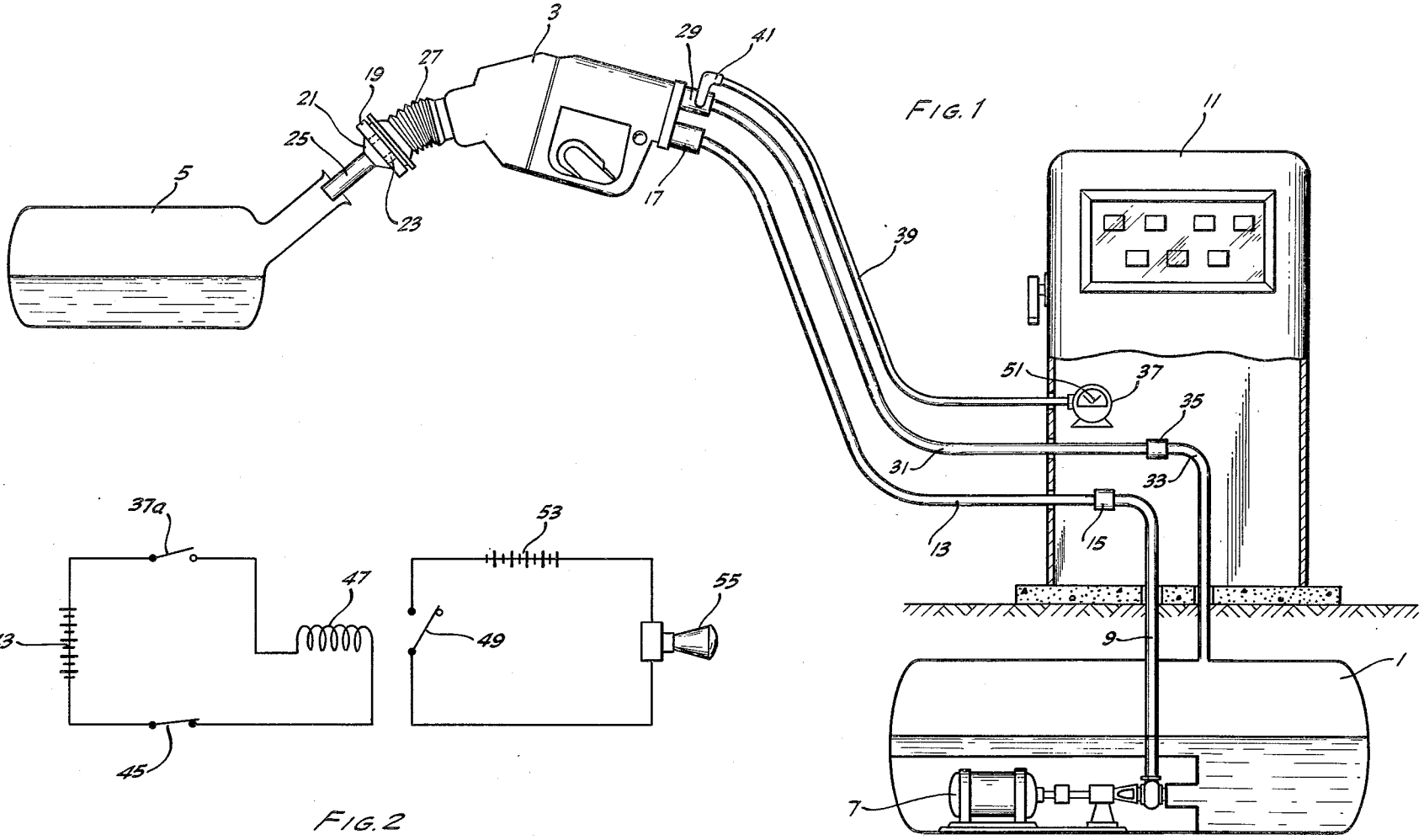
Figure 3:
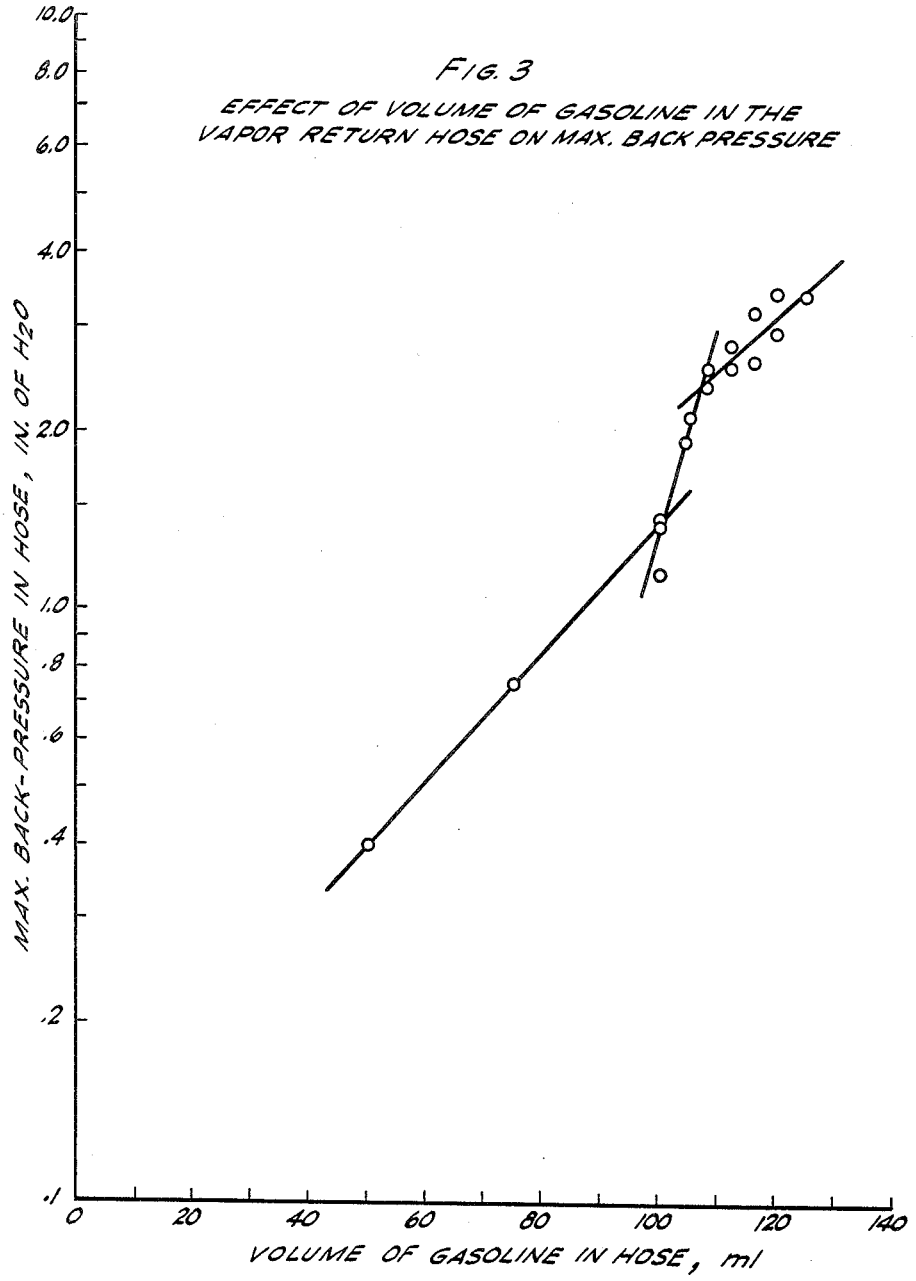

United States Defensive Publication [19] (H) [11] T997,001

Dougherty [43] Aug. 5, 1980

[54] GASOLINE DISPENSING APPARATUS

[76] Inventor: Michael J. Dougherty, 1850 N. Brea Blvd., #F-13, Fullerton, Calif. 92635

[21] Appl. No.: 4,593

[22] Filed: Jan. 18, 1979

Related U.S. Application Data

[63] Continuation of Ser. No. 783,671, Apr. 1, 1977, abandoned.

[51] Int. Cl.³ ..... B65B 3/18

[52] U.S. Cl. ..... 141/95

[57] ABSTRACT

A gasoline dispensing system having vapor removal means associated therewith incorporating a pressure-actuated switch for detecting increased gas pressure in said vapor removal means when a liquid blockage occurs therein. When the gas pressure exceeds a predetermined amount, said pressure switch energizes an electrical circuit comprising an alarm.

5 Claims, 2 Sheets Drawing,

12 Pages Specification

The file of this unexamined application may be inspected and copies thereof may be purchased (849 O.G. 1221, Apr. 9, 1968).

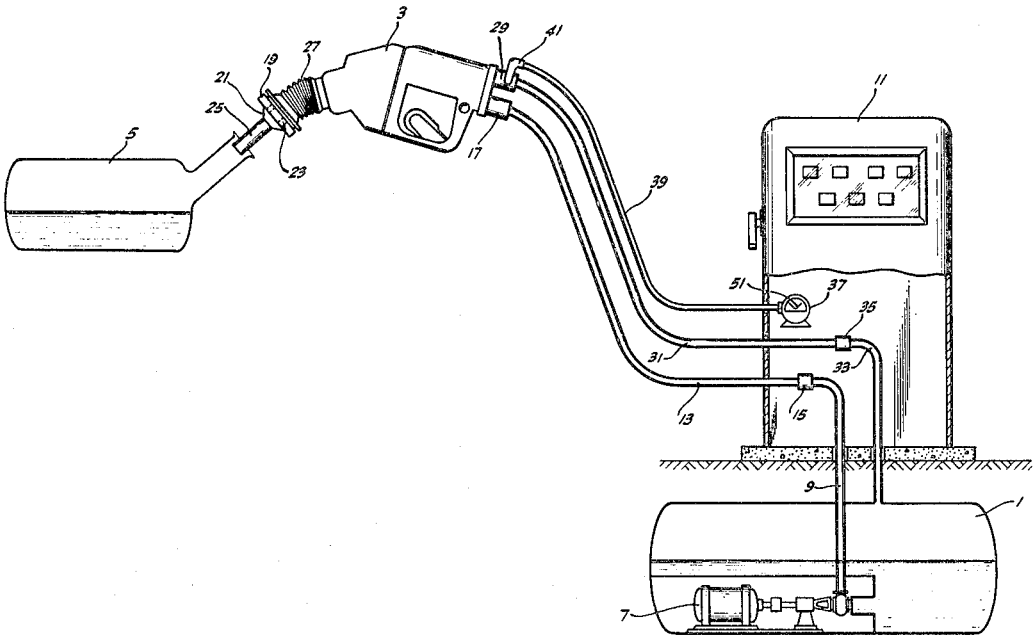

EFFECT OF VOLUME OF GASOLINE IN THE VAPOR RETURN HOSE ON MAX. BACK PRESSURE
MAX. BACK-PRESSURE IN HOSE, IN. OF H2O
10.0
8.0
6.0
4.0
2.0
1.0
.8
.6
.4
.2
.1
0
20
40
60
80
100
120
140
VOLUME OF GASOLINE IN HOSE, ml